(12) United States Patent
Broude et al.

(10) Patent No.: US 8,143,563 B2
(45) Date of Patent: Mar. 27, 2012

(54) ENHANCED GLARE REDUCTION

(76) Inventors: Craig Broude, Los Angeles, CA (US); Leon D. Rosen, Santa Monica, CA (US)

( * ) Notice: Subject to any disclaimer, the term of this patent is extended or adjusted under 35 U.S.C. 154(b) by 354 days.

(21) Appl. No.: 12/589,296

(22) Filed: Oct. 20, 2009

(65) Prior Publication Data

US 2010/0065721 A1  Mar. 18, 2010

Related U.S. Application Data

(63) Continuation-in-part of application No. 11/899,325, filed on Sep. 5, 2007, now abandoned.

(51) Int. Cl.
*G01J 1/00* (2006.01)
*B60J 3/04* (2006.01)

(52) U.S. Cl. .................. 250/203.4; 345/7; 359/614

(58) Field of Classification Search .............. 250/229, 250/231.1, 203.2, 203.3, 203.4, 201.1; 345/7, 345/173, 175; 359/301, 309, 614
See application file for complete search history.

(56) References Cited

U.S. PATENT DOCUMENTS

| | | | | |
|---|---|---|---|---|
| 3,961,181 | A | * | 6/1976 | Golden ................. 250/208.2 |
| 4,641,922 | A | * | 2/1987 | Jacob ..................... 349/16 |
| 4,832,468 | A | | 5/1989 | Ito et al. |
| 4,892,394 | A | * | 1/1990 | Bidabad ................. 359/275 |
| 5,258,607 | A | * | 11/1993 | Agostini et al. .......... 250/201.1 |
| 5,298,732 | A | * | 3/1994 | Chen ..................... 250/203.4 |
| 5,305,012 | A | | 4/1994 | Faris |
| 5,841,507 | A | * | 11/1998 | Barnes ..................... 351/49 |
| 6,864,473 | B2 | | 3/2005 | Chretien et al. |
| 6,873,376 | B1 | | 3/2005 | Rofe |
| 7,134,707 | B2 | | 11/2006 | Isaac |
| 7,164,117 | B2 | | 1/2007 | Breed et al. |
| 7,199,767 | B2 | * | 4/2007 | Spero ..................... 345/7 |
| 2007/0252821 | A1 | | 11/2007 | Hollemans et al. |
| 2009/0058126 | A1 | * | 3/2009 | Broude et al. ............ 296/97.2 |
| 2010/0065721 | A1 | * | 3/2010 | Broude et al. ............ 250/201.1 |

\* cited by examiner

*Primary Examiner* — John Lee
(74) *Attorney, Agent, or Firm* — Leon D. Rosen

(57) ABSTRACT

The driver of a vehicle (10) is protected from glare caused by the bright lights of an oncoming vehicle at night, or by the Sun lying low in the sky. The vehicle windshield (20) is divided into pixels (42) whose transparency can be reduced. The transparency of a limited area of the windshield is controlled by reducing the transparency of windshield pixels that lie along the light path (32) of bright light that passes through an area (34) of the windshield to the driver's eyes. In one system, a small sensor (44) includes a sensor plate (50) with an array of sensor pixels (54), and a lens (56) that forms an image of a forward portion of the environment on the sensor pixel array. An electronic circuit (70) couples sensor pixels to corresponding windshield pixels, and reduces the transparency of windshield pixels when corresponding sensor pixels are brightly illuminated. In another system, a sensor is provided that senses a finger (84) of the driver touching one of the windshield pixels to reduce the transparency of that window pixel for a selected time period.

4 Claims, 2 Drawing Sheets

ENHANCED GLARE REDUCTION

CROSS-REFERENCE

This is a continuation-in-part of U.S. patent application Ser. No. 11/899,325 filed Sep. 5, 2007 now abandoned.

BACKGROUND OF THE INVENTION

Two of the most common sources of glare are the headlights of an oncoming vehicle in an adjacent lane, and the Sun when it cannot be blocked by a sun visor. Apparatus that enabled a driver to block these and other sources of glare would be of value.

SUMMARY OF THE INVENTION

In accordance with one embodiment of the invention, an apparatus is provided that can be activated to block glare that otherwise would reach the eyes of a vehicle driver from a region of the environment normally viewable through the windshield (or even the driver side window). The apparatus includes a windshield with pixels whose transparency, can be varied, and means for reducing the transparency of pixels that lie approximately between a glaring light source and the driver's eyes while not reducing the transparency of the rest of the windshield. The rest of the windshield remains highly transparent so the driver can clearly view the road area.

In one system, the means for reducing transparency includes a small sensor with a sensor area having multiple sensor pixels, and a lens that forms an image of the viewed environment region onto the sensor area. Each sensor pixel corresponds to a predetermined windshield pixel. The apparatus also includes a circuit that reduces the transparency of those windshield pixels whose corresponding sensor pixels are brightly illuminated (compared to the rest of the sensor area). The windshield area whose transparency is reduced, is preferably horizontally elongated to block glare from both eyes of the driver.

In another system, windshield sensors are provided that sense when the driver's finger touches a particular area of the windshield. A circuit reduces the transparency of the windshield area that was touched. The reduction in transparency continues for a short period such as 20 seconds when windshield areas near the bottom of the windshield left side are touched that may imply the presence of glare from an oncoming vehicle. The reduction in transparency may continue for a longer period such as two minutes when a windshield area near the top of the windshield is touched that implies glare from the Sun.

The novel features of the invention are set forth with particularity in the appended claims. The invention will be best understood from the following description when read in conjunction with the accompanying drawings.

DESCRIPTION OF THE PREFERRED EMBODIMENT

Figure 1:
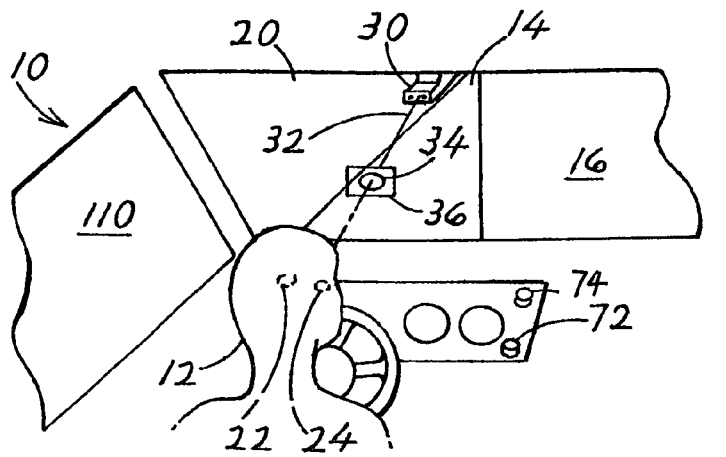
FIG. 1 is a partial isometric view of a driver in a vehicle who experiences glare from an oncoming vehicle.

FIG. 1 illustrates a portion of a vehicle 10 and a driver 12 who is driving the vehicle at night along a road 14. The driver is viewing a portion 16 of the environment through the windshield 20 of the vehicle. The drivers's eyes 22, 24 are located at a constant known lateral position (distance from one side of the vehicle) and at a constant known vertical position. The positions are those positions used the last time a manual adjustment in known lateral or vertical position of his/her eyes was made. An oncoming vehicle 30 has headlights in a "high-beam" position that produce light beams 32. Light that passes through a horizontally elongated area 34 of the windshield normally would reach the drivers eyes and produce glare. In accordance with the present invention, a glare-blocked zone or region 36 of the windshield has its transparency reduced to prevent the driver from experiencing glare.

The position of the zone 36 on the windshield is chosen to be the position that will block glare at the eyes position of an "average" adult (e.g. of a person of a height of 5 feet, 5 inches and common relative body dimensions). As discussed below, the position of the glare-blocked zone is preferably manually adjustable. The rest of the windshield (away from the glare-blocked zone) remains fully transparent, so the driver continues to view the environment portion that he usually views through the windshield so he can drive safely. The headlights from an oncoming vehicle, and the Sun, each can be considered to be a point-like source, because most light from them can be blocked from the driver's eyes by reducing the opacity of a windshield area that is no more than 10% of the windshield width and no more than 10% of the windshield height.

Figure 2:
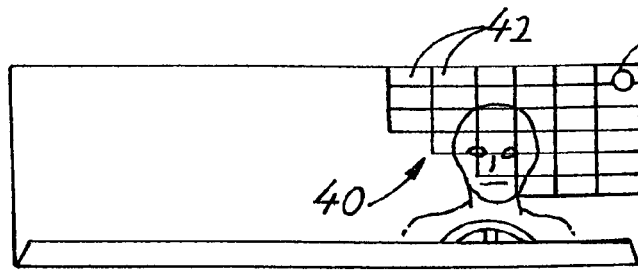
FIG. 2 is a front elevation view of the driver of FIG. 1, and showing a sensor that can control the reduction of glare.
Figure 3:
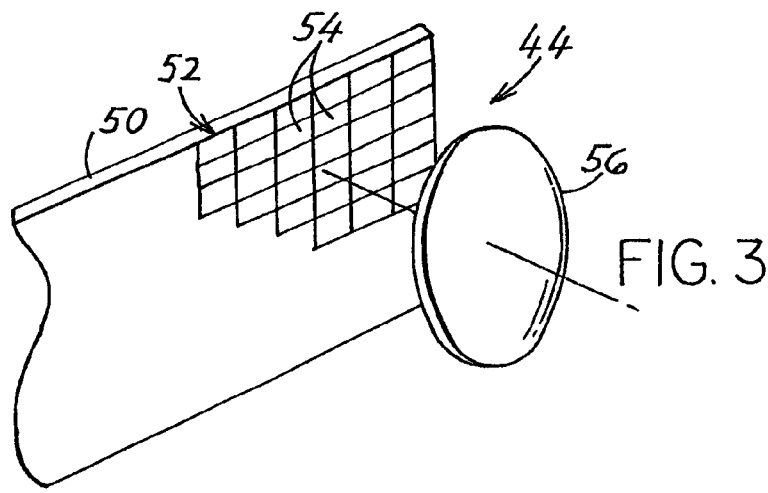
FIG. 3 is a partial isometric view of the sensor of FIG. 2.
Figure 5:
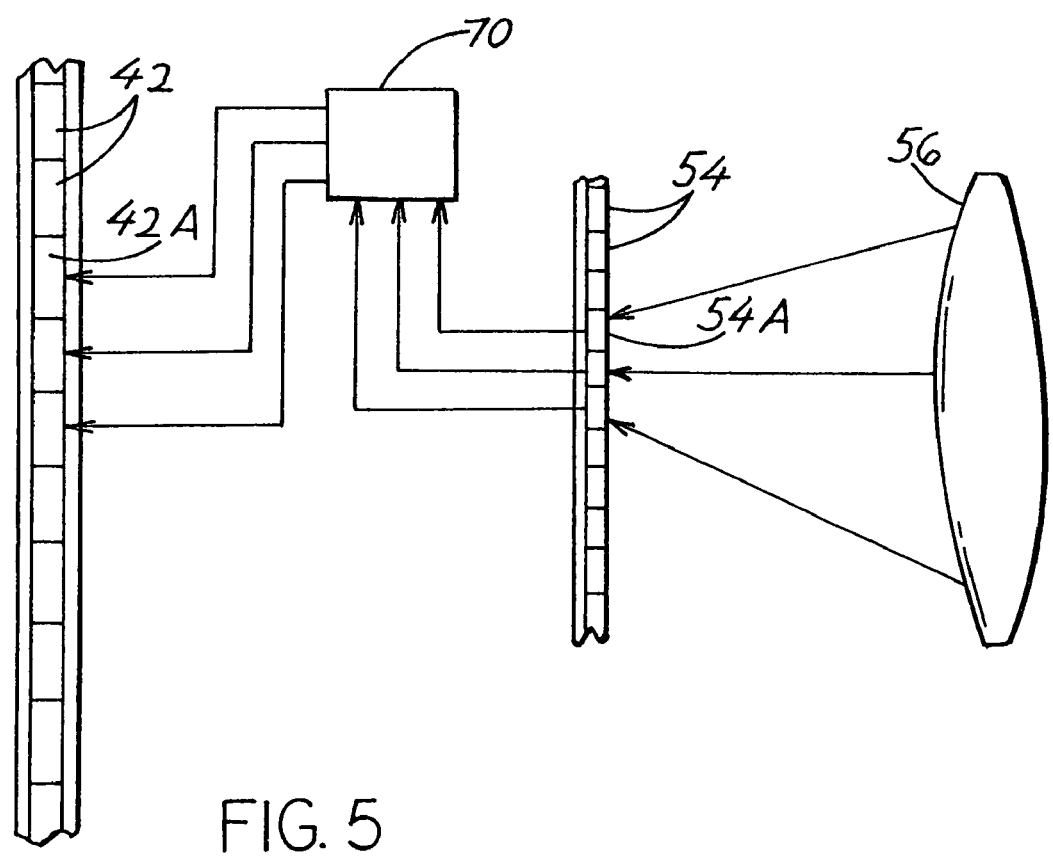
FIG. 5 is a schematic view of a circuit that is connected to the sensor of FIG. 3 and the windshield of FIG. 2, and that controls the transparency of windshield pixels according to the output of the sensor.

FIG. 2 shows the driver and a portion of the windshield, and shows a part 40 of the windshield that the driver most commonly sees through, or locks through, and that is divided into windshield pixels 42. The figure also shows a small sensor 44 that lies beside the windshield part 40. The sensor 44 controls the windshield portion 40 to reduce the transparency (which is the same as to increase the opacity) of selected pixels of the windshield. Preferably, no correction is made to account for the parallax error between the sensor 44 and the middle of the windshield part 40. FIG. 3 shows that the sensor 44 includes a plate 50 (e.g. a PCB) with a sensor area 52 thereon containing multiple sensor pixels 54. Each sensor pixel corresponds approximately to a windshield pixel. A lens 56 of the sensor forms an image onto the sensor area 52, of a part of the environment portion seen through the windshield, that corresponds to the part 40 of the windshield whose transparency can be decreased. FIG. 5 shows a circuit 70 that receives the output of each sensor pixel 54 and controls the transparency of corresponding windshield pixels 42.

Figure 4:
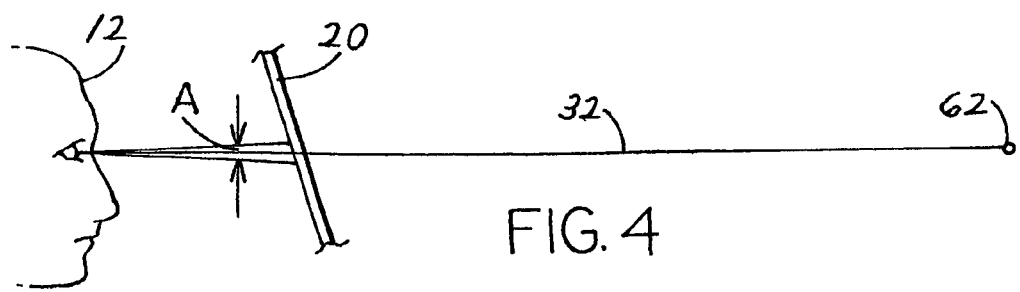
FIG. 4 is a side elevation view of the driver and windshield of FIG. 1, showing the vertical angle of light from a source of glare.

It is possible to provide a one-to-one, or direct correlation between each sensor pixel such as 54A and a windshield pixel such as 42A, so when a high level of light is detected at 54A, the circuit reduces the transparency of windshield pixel 42A. However, it is also possible to vary the transparency of more than one windshield pixel when a corresponding sensor pixel is subjected to glare, or to choose a windshield pixel according to the outputs of a plurality of sensor pixels. For example, if the windshield pixels and sensor area pixels are each of a square shape, it may be desirable to reduce the transparency of not only a corresponding windshield pixel, but also of the windshield pixels on horizontally opposite sides of the corresponding windshield pixel to block light to both eyes of the driver. FIG. 4 shows that light beams may pass along an angle of no more than about 1° from the source 62 to the driver 12, but the window pixels may be large enough, or enough small window pixels may have their transparency reduced, that transparency is reduced along an angle A of at least 3° degrees from a point halfway between the driver's eyes.

A determination of what constitutes a light source bright enough to create a glare, is preferably based upon the average intensity of light in the viewed environment portion at that time. This can be determined by averaging the output of all sensor pixels, or by taking the output of a simple sensor that is directed at the environment forward of the vehicle. For a bright oncoming vehicle headlight at night when the average pixel output is low, it requires a much less intense light source to cause a reduction in transparency of a window pixel(s), than the brightness of the Sun during the day when the average pixel output is much higher.

The amount of light that is blocked when a window pixel transparency is to be reduced, is preferably at least of the same order of magnitude as the percent of light blocked by dark sunglasses. It is also possible to reduce, to a smaller extent, the transparency of window pixels that lie around a window pixel that corresponds to a sensor pixel that has been brightly illuminated. This reduces the glare for a driver even if the driver's eyes are not precisely aligned with the center pixel. In that case, a driver then may raise or lower his/her head or shift his/her body slightly to center his/her eyes on the center of the glare-blocked zone or pixel(s) of the windshield if the supposed driver position has not been adjusted to lie at the center of the eyes of the actual driver.

A manually operated control is preferably provided which can be operated to shift the assumed, or known, driver's eyes positions vertically and possibly also horizontally. This adjusts for a tall or short driver. However, vertical adjustment can be made by the driver tilting his head up or down. After any such manual adjustment, the assumed position of the driver's eyes is not changed. In one example, a short driver is driving an auto that previously was driven by a tall driver. When a glare such as the sun appears, the short driver notices that he/she must raise his/her body to place his/her eyes in a "glare-blocked" zone. The driver then may turn a knob on the windshield to lower the glare-blocked zone until the glare is blocked while the driver's body is in a comfortable position. The position (laterally and vertically) of the glare-blocked zone remains constant until the manual control is manually operated. There is no optical (e.g. by infrared light) or electronic (by computer), or electro-optical (both by light and electronic or computer circuit) determination of the driver's eyes. FIG. 1 shows a manual control in the form of a knob 74 that can be turned clockwise to lower the position of the glare-blocked zone 36, and which can be turned counter-clock wise to raise the position of the zone. When the glare-blocked zone is lowered, the sensor pixels that correspond to windshield pixels are electronically shifted vertically. If no manual vertical shifting is provided then no electronic shifting of correspondence is required.

Preferably, the system contains a switch 72 (FIG. 1) that a driver can manually operate to energize the glare-reduction system of the invention, so it operates only when the driver senses glare or that glare is approaching, and afterward the driver de-energizes the system. The system does not reduce transparency when the window pixels are not energized. The area covered by pixels can be increased to block glare cause by reflections of the sun from another vehicle, but this usually is not as annoying.

Figure 6:
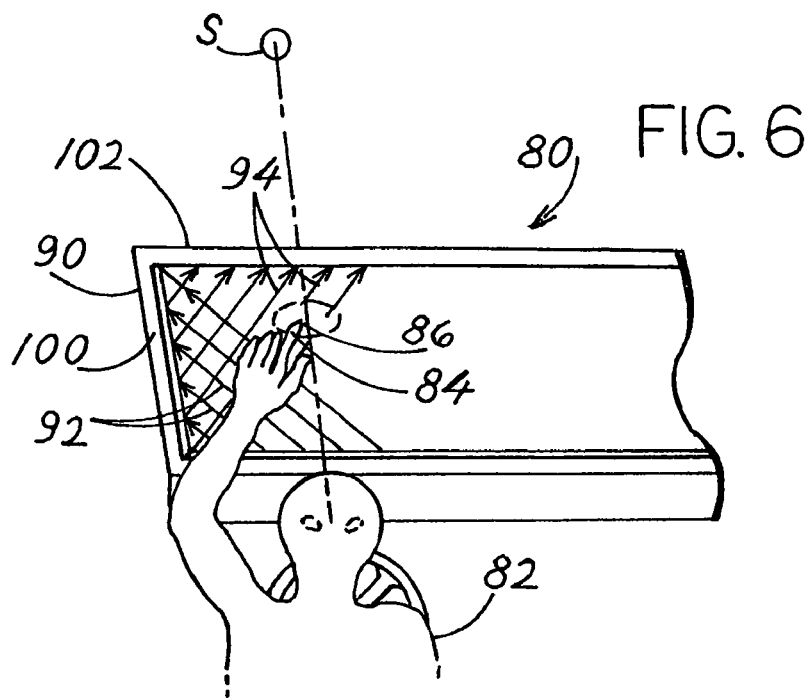
FIG. 6 is an isometric view of a driver in a vehicle, who is touching a windshield in a system of another embodiment of the invention, to block glare from the Sun.

FIG. 6 shows another system 80 for reducing driver glare, wherein the driver 82 extends a finger 84 so the fingertip touches a location 86 on the inside of the window where the driver sees glaring light coming from, such as from the sun S. This causes a reduction of the transparency of that location of the window, and preferably an additional limited area around the touched location. A variety of devices are available to detect the location where a person touches a screen. One example which can be used for a largely flat windshield area is a device 90 that directs light beams 92, 94 in largely perpendicular directions across the inside of the windshield. Detectors 100, 102 detect the two thin largely perpendicular beams that are interrupted by a finger touching (or lying very close to) the window and reduce the transparency of a pixel at the location being touched.

The reduction in transparency continues for a period of time such as several seconds to several minutes or longer. For example, if the touched location is near the lower left part of the windshield and the average light from the environment is low, this indicates that glare comes from the headlights of an oncoming vehicle. In that case, it may be sufficient to block that area for several seconds. If the touched area is near the top of the windshield and the average light in the environment is high, this indicates that the light is from the Sun, and it may be desirable to continue blocking the touched area for a longer period such as two minutes. The predetermined time period that a glare-blocking area of the windshield has its transparency reduced is set at a factory and possibly adjustable by the driver when he/she is not driving (i.e. the auto is not moving), but the time period is not set by the driver each time the driver touches the screen. A driver who notices that he/she is on a curved road, may touch the windshield along a line, so that light from the Sun is blocked even as the apparent Sun position changes. When the glare is from the headlights of an oncoming vehicle, the driver may touch a line area on the windshield to block light as the oncoming vehicle approaches.

Although most annoying light is on a path to pass through the windshield 20 (FIG. 1) of the vehicle, annoying light also can be received through the driver side window 110, especially sunlight that heats and may burn the driver's skin. The driver side window can be made so the entire side window or the upper two-thirds of it is blocked, such as automatically by a sensor that senses sunlight that appears to pass through the side window to anywhere on the driver, or by the driver touching the side window (possibly after operating a switch similar to 72 of FIG. 1).

Thus, the invention provides an apparatus or system for reducing glare for drivers, especially glare from headlights on a "high-beam" setting of an oncoming vehicle, and from the Sun. The system includes a windshield through which a driver views the environment forward of the vehicle, and with at least limited areas of the windshield being controllable to have a reduction in transparency. The windshield preferably contains a plurality of small pixels, each constituting less than 10% of the windshield area, and each being selectively controllable to have a reduced transparency. In one system, a sensor has a sensor area with sensor pixels on which an image of the forward-looking environment is focused. A circuit connected to sensor and window pixels reduces the transparency of window pixels whose corresponding sensor pixels have been exposed to bright light. In another system, a detector detects a location where a driver has touched the inside of the windshield, and reduces the transparency of a corresponding location on the windshield.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for use in a vehicle to protect a driver whose eyes are at a predetermined eye position, from bright lights originating from point-like sources, including a windshield with a part (40) that the driver most commonly looks through to view an area of the environment that is generally forward of the vehicle, said windshield having multiple windshield pixels whose transparency and opacity can be varied, comprising:

a sensor (44) located beside said windshield part (40) and having a sensor area containing multiple sensor pixels (54), a lens (56) that forms an image of said environment area onto said sensor area, and a circuit (70) coupled to said multiple sensor pixels and to said windshield pixels that controls the transparency of each of said windshield pixels in accordance with the amount, or intensity, of light falling on a directly corresponding one of said sensor pixels, without opto-electronically determining the position of the driver's eyes;

said circuit constructed to reduce the transparency of a glare-blocked zone of said windshield pixels that comprises at least one windshield pixel, where the directly corresponding sensor pixel is receiving a highest intensity of light of all sensor pixels, to block glaring light that would otherwise reach the driver's eyes at said predetermined eye position by passing through said glare-blocked zone.

2. The apparatus described in claim 1 including:

a manual control that is manually operable by said driver to move said predetermined eye position up or down to a new predetermined position.

3. Apparatus for use in a vehicle to avoid exposing a driver to glare, where the driver's eyes have a center located at a predetermined eye position with respect to the vehicle windshield, and where the glare is caused by a bright light that passes along a path through the windshield to said eye position, wherein:

said windshield has multiple pixels lying in a windshield part (40) that the driver usually looks through and whose transparency can be reduced; and including a sensor that lies beside said windshield part and that has a sensor area and a lens that forms an image of the environment that can be seen through at least portions of said windshield onto said sensor area with parts of said sensor area each corresponding directly to pixels of said windshield; and a circuit that detects high relative illumination of limited areas of said sensor area and that reduces the transparency of corresponding pixels of said windshield.

4. Apparatus for use in a vehicle that includes a windshield, to avoid exposing a driver to glare, wherein: said windshield has multiple areas whose transparency can be reduced; and including a sensor that senses which of multiple windshield areas that the driver manually touches, and a circuit coupled to said sensor that reduces the transparency of that windshield area that is touched by the driver; and wherein:

said circuit is constructed to maintain said windshield area that was touched, at a reduced transparency only for a predetermined time period that is at least one second, without requiring said driver to set the time period each time the driver touches said one of said windshield areas.

* * * * *